(12) United States Patent
Kittel et al.

(10) Patent No.: US 6,365,255 B1
(45) Date of Patent: Apr. 2, 2002

(54) ARTICLES USED FOR APPLYING DELICATE FILMS FOR SECURITY PURPOSES

(75) Inventors: Mark D. Kittel, Berea; Charles K. Herrmann, Cleveland Heights, both of OH (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/185,983

(22) Filed: Nov. 4, 1998

(51) Int. Cl.⁷ ................................................ B32B 9/00
(52) U.S. Cl. ................. 428/41.8; 283/81; 428/40.1; 428/40.2; 428/41.3; 428/42.1; 428/138; 428/213
(58) Field of Search ............... 428/40.1, 40.2, 428/41.3, 41.8, 42.1, 138, 213; 283/81

(56) References Cited

U.S. PATENT DOCUMENTS

| | | | |
|---|---|---|---|
| 3,864,855 A | | 2/1975 | Pekko et al. .................. 40/2 |
| 4,153,206 A | * | 5/1979 | Haefner .................. 241/14 |
| 5,346,259 A | | 9/1994 | Mocilnikar et al. ......... 283/108 |

* cited by examiner

Primary Examiner—Nasser Ahmad
(74) Attorney, Agent, or Firm—Renner, Otto, Boisselle & Sklar

(57) ABSTRACT

This invention relates to an article useful in applying a tamper evident film comprising a frangible layer which is bonded on one side to an adhesive and on the other side to a laminate support layer wherein the bond between the frangible layer and the support layer is a non-destructible bond.

The present invention provides an article which is able to apply frangible and delicate tamper evident films to articles. The invention also relates to methods of applying tamper evident films.

17 Claims, 1 Drawing Sheet

ARTICLES USED FOR APPLYING DELICATE FILMS FOR SECURITY PURPOSES

TECHNICAL FIELD OF THE INVENTION

This invention relates to an article which is useful in applying tamper evident films to articles such as documents and drivers licenses.

BACKGROUND OF THE INVENTION

Destructible films are often used as a means for providing security to articles and documents. Typically, these destructible films are provided in a multilayered environment wherein the tampering forces break a portion of the destructive film thereby providing the indication of tampering. One area of application for destructible films is in the area of passport protection. In the area of passports, it is common for the passport to identify a child traveling with a parent using thermal transfer technology. It is relatively easy to alter the passport printed in this means. There is a need for a means to prevent tampering with passports.

SUMMARY OF THE INVENTION

This invention relates to an article useful in applying a tamper evident film comprising a frangible layer which is bonded on one side to an adhesive and on the other side to a laminate support layer wherein the bond between the frangible layer and the support layer is a non-destructible bond.

The present invention provides an article which is able to apply frangible and delicate tamper evident films to articles. The invention also relates to methods of applying tamper evident films.

DETAILED DESCRIPTION OF THE PREFERRED EMBODIMENTS

Figure 1:
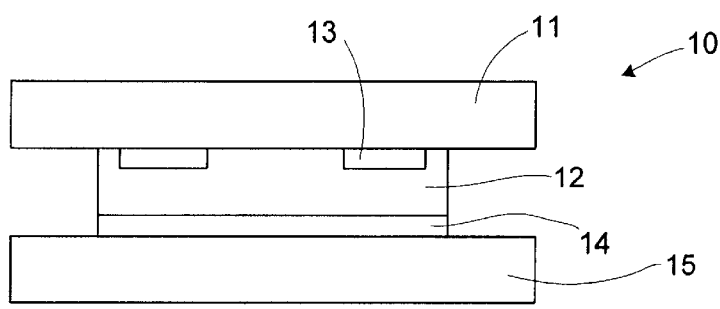
FIG. 1 is a cross-sectional area of the article useful in applying a tamper evident film.

In the specifications and appended claims, the use of the term "non-destructible bond" refers to the situation where a destructive force is applied to separate the two films attached by the adhesive, the adhesive breaks and the films are not destroyed.

As described above, the present invention relates to articles which provide a delicate frangible film for security purposes. The film may be applied to document, drivers licenses, and passports to provide a covering which reveals tampering of the document.

The frangible layer is a layer which will break before removing intact from a document. The frangible film layer may be either clear or opaque. It may be printed with indicia or unprinted. Frangible layers typically have a thickness of about 0.25 to it about 5 mils, or from about 0.5 to about 2 or from about 0.8 to about 1.5 mils. The frangible layer may be prepared from film forming polymer or a deadened adhesive layer which is brittle or very thin. Examples of these polymers include polystyrene, thin epoxy polymers or unplasticized vinyl polymers, such as unplasticized polyvinyl chloride or fluoride. In a preferred embodiment, the frangible layer is a polystyrene available from Dow. The deadened adhesive layer consists of an acrylic or rubber based adhesive in thickness typically ranging from about 0.5 to about 5, or from about 0.8 to about 4, or from about 1 to about 3 mils. The deadning layer is typically a cured varnish or ink layer in thickness from about 0.5 to about 5, or from about 0.8 to about 4, or from about 1 to about 3 microns. It is either a U.V. solvent or water based varnish layer. The deadened adhesive layer may be either printed with copy or unprinted.

As described above, the frangible layer is connected to a laminate support layer. The laminate support layer typically has a thickness from about 0.5 to about 4, or from about 1 to about 3, or about 1.5 to about 2.5 mils. The polymer films include polyolefins (linear or branched), polyamides, polystyrenes, nylon, polyesters, polyester copolymers, polyurethanes, polysulfones, styrene-maleic anhydride copolymers, styrene-acrylonitrile copolymers, ionomers based on sodium or zinc salts of ethylene methacrylic acid, polymethyl methacrylates, cellulosics, acrylic polymers and copolymers, polycarbonates, polyacrylonitriles, and ethylene-vinyl acetate copolymers. Included in this group are the acrylates such as ethylene methacrylic acid, ethylene methyl acrylate, ethylene acrylic acid and ethylene ethyl acrylate. Also, included in this group are polymers and copolymers of olefin monomers having, for example, 2 to about 12 carbon atoms, and in one embodiment 2 to about 8 carbon atoms. These include the polymers of $\alpha$-olefins having from 2 to about 4 carbon atoms per molecule. These include polyethylene, polypropylene, poly-1-butene, etc. An example of a copolymer within the above definition is a copolymer of ethylene with 1-butene having from about 1 to about 10 weight percent of the 1-butene comonomer incorporated into the copolymer molecule. The polyethylenes that are useful have various densities including low, medium and high density ranges. The low density range is from about 0.910 to about 0.925 $g/cm^3$; the medium density range is from about 0.925 to about 0.940 $g/cm^3$; and the high density range is from about 0.940 to about 0.965 $g/cm^3$. An example of a commercially available material that is useful is available from Du Pont under the trade designation Mylar LB; this material is identified as being a biaxially oriented polyester film. Films prepared from blends of copolymers or blends of copolymers with homopolymers also are useful. The films may be extruded as monolayered films or multilayered films. The films may be oriented films or nonoriented films. The laminate layer is typically prepared from polyesters, or polyolefins or polyesters. In one embodiment, the polyesters are phthalate based polyesters such as polyethylene terephthlates. An example of a useful polyester is Hostaphan available commercially from Hoechst.

The frangible layer and the laminate support layer are attached with a non-destructive bond. The adhesive layer may be comprised of any removable pressure-sensitive adhesive material, or radiation-curable, especially UV curable, adhesive material suitable for coating a film substrate. When the adhesive layer is a radiation-curable adhesive layer, it is transparent. When the adhesive layer is a removable pressure sensitive adhesive layer, it is preferably (but not necessarily) transparent. The radiation-curable adhesive materials may be made from compositions containing multifunctional acrylate monomers and oligomers. Acrylated urethanes and acrylated acrylics are useful. The radiation-curable adhesives may include photoinitiators and optionally surfactants to provide a uniform flow resulting in an even coating. An examples of a commercially available adhesive material that can be used include Rad-Cure UV 1008 (a product of Rad-Cure Corporation identified as a UV-curable, solvent-free adhesive containing 70–95% by weight multifunctional acrylate monomers and oligomers, 5–20% by weight photoinitiator and 0–5% by weight surfactants) and Magnacryl 2807 available from Beacon Chemical Company.

The adhesive layer has a thickness that is typically in the range of about 0.5 to about 5 microns, and in one embodiment about 1 to about 4 microns, and in one embodiment about 1.5 to about 2 microns. In one embodiment, the non-destructive bond is prepared by a pattern coated UV curable adhesive.

The present articles have a pressure sensitive adhesive bonded to the frangible film and releasably bonded to a release liner. The pressure sensitive adhesive is typically a transparent or clear pressure sensitive adhesive. In one embodiment the pressure sensitive adhesive is an acrylic pressure sensitive adhesive. These adhesives are generally copolymers of acrylic acid esters, such as 2-ethyl hexylacrylate, with polar commoners such as acrylic acid. Examples of useful pressure sensitive adhesives include adhesive "P-9" and "P-14".

The invention is further illustrated in relation to the drawings. In FIG. 1, the article 10 is shown having laminate support layer 11 non-destructibly adhered to frangible layer 12 through adhesive 13. Frangible layer 12 is releasably bonded to pressure sensitive adhesive 14, which in turn is releasably bonded to release liner 15. By way of example, laminate layer 11 is typically a 2 mil polyethylene terephthalate film; layer 12 is a 1.2 mil polystyrene film available from Dow; adhesive 13 is Magnacryl 2807 available from Beacon Chemical Company; pressure sensitive adhesive 14 is "P-14" available from Avery Chemicals; and release liner 15 is a 50 lb. paper liner.

Figure 2:
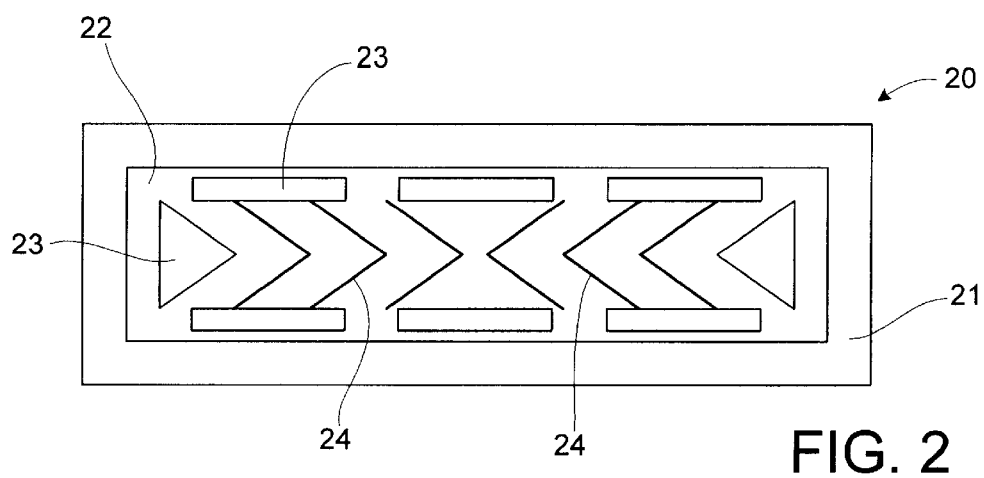
FIG. 2 is a top view of the article.

FIG. 2 shows the article without a release liner. Article 20 has laminate layer 21 non-destructibly bonded to frangible layer 22 with adhesive 23 making the destructible bond in pattern coating. Frangible layer 22 also has tamper evident slits 24. Tamper evident slits are those in the frangible film which weaken the film. The slits may be in any pattern. In one embodiment, the slits do not reach the edge of the frangible layer. The slits may be prepared by die cutting.

The articles of the present invention may be made by means ordinarily known to those in the art. For example, a polystyrene film may be obtained and coated with a pressure sensitive adhesive and bonded to a release liner. This construction can then be die cut through the frangible layer and the adhesive but not through the release liner. The article is then matrix stripped to remove the materials that surround die cut labels. The resulting material has a continuous liner layer with a series of labels on one side. This construction is then pattern coated with an adhesive. The resulting construction is then laminated to a laminate support layer. The resulting product is perforated in the areas between the frangible labels to form individual labels. The perforation goes through the liner and the support layer. The non-destructible bond is formed after pattern coating where the article is passed through UV lamps to cure the adhesive.

Figure 3:
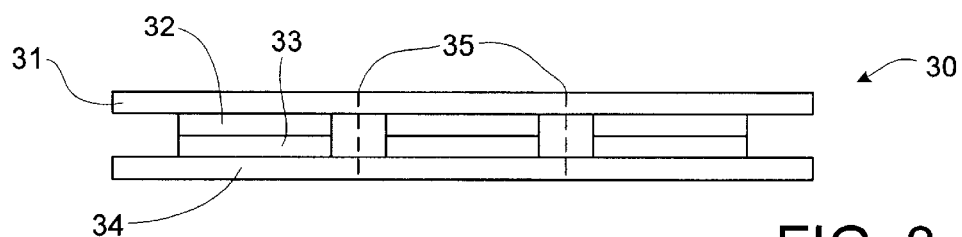
FIG. 3 illustrates the one means of producing the articles of the present invention.

The method is further illustrated by reference to FIG. 3. FIG. 3 provides roll 30 which has a laminate support layer 31 non-destructibly bonded to frangible layer 32. Frangible layer 32 is bonded to pressure sensitive adhesive 33. Pressure sensitive adhesive 33 is releasably bonded to release liner 34. The roll shows the results of matrix stripping where individual labels are formed. The individual portions of the article are able to be separated by perforations 35.

In one embodiment, the present invention provides a means for protecting documents from tampering. The present method involves the application of a frangible film to the document over the area of the document which is to be protected from tampering. This method is accomplished by providing a frangible film non-destructibly bonded to a laminate support layer. The frangible layer is supported on the laminate layer by non-destructible bonding. The opposite side of the frangible layer is coated with a pressure sensitive adhesive. The frangible layer is positioned over the portion of the document to be protected. The frangible layer, with pressure sensitive adhesive side down toward the document, is pressed against the document to provide bonding of the frangible layer to the document. The laminate support layer is then removed from the frangible layer by fracturing the adhesive bond between the frangible layer and the laminate support layer.

Figure 4:
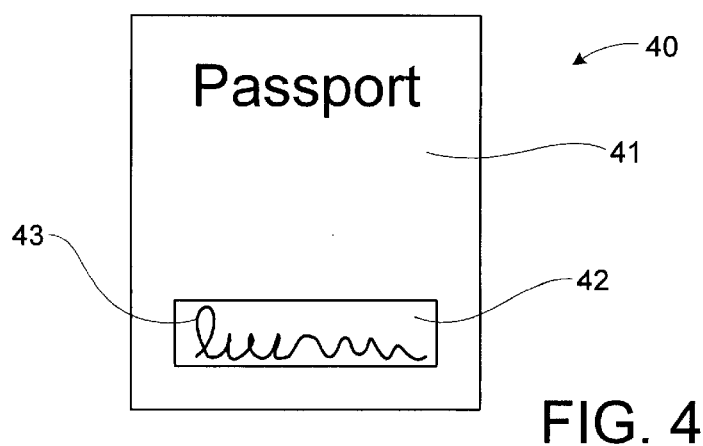
FIG. 4 illustrates the method of protecting documents, such as passports.

The method is further illustrated by reference to FIG. 4. Passport 41 has writing 43 which needs to be protected from tampering. Frangible layer 42 is applied over writing 43 and adhered with a pressure sensitive adhesive. Therefore, writing 43 is protected from tampering. This is particularly useful in passports where the printing is done by thermal transfer printing. Children may be smuggled out of the country by indicating on the passport the presence of the child traveling with the adult. After exiting the country, the child may be improperly placed into adoption agencies and the passport altered to erase the presence of the child. The present invention prevents the alteration of the passport after thermal transfer printing.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. An article useful in applying a tamper evident film comprising a frangible layer which is bonded on one side to an adhesive and directly bonded on the other side to a removable laminate support layer wherein the bond directly between the frangible layer and the laminate layer is a non-destructible bond.

2. An article useful in applying a tamper evident film comprising a frangible layer which is bonded on one side to an adhesive and on the other side to a removable laminate support layer wherein the bond between the frangible layer and the laminate layer is a non-destructible bond, and wherein the frangible layer is polystyrene or a vinyl halide polymer.

3. An article useful in applying a tamper evident film comprising a frangible layer which is bonded on one side to an adhesive and on the other side to a removable laminate support layer wherein the bond between the frangible layer and the laminate layer is a non-destructible bond, and wherein the frangible layer is a deadened pressure sensitive adhesive material.

4. An article useful in applying a tamper evident film comprising a frangible layer which is bonded on one side to an adhesive and on the other side to a removable laminate support layer wherein the bond between the frangible layer and the laminate layer is a non-destructible bond, and wherein the frangible layer is a polystyrene.

5. The article of claim 1 wherein the frangible layer has a thickness of 0.25 to about 2 mils.

6. The article of claim 1 wherein the laminate support layer is a polyolefin or polyester.

7. An article useful in applying a tamper evident film comprising a frangible layer which is bonded on one side to an adhesive and on the other side to a removable laminate support layer wherein the bond between the frangible layer and the laminate layer is a non-destructible bond, and wherein the laminate support layer is a phthalate ester.

8. The article of claim 1 wherein the laminate support layer has a thickness from about 0.5 to about 4 mils.

9. An article useful in applying a tamper evident film comprising a frangible layer which is bonded on one side to an adhesive and on the other side to a removable laminate support layer wherein the bond between the frangible layer and the laminate layer is a non-destructible bond, and wherein the non-destructive bond is formed using a UV curable adhesive.

10. The article of claim 1 wherein the non-destructible bond is formed with a pattern coated adhesive.

11. The article of claim 1 wherein the adhesive is also attached to a release liner.

12. An article useful in applying a tamper evident film comprising a frangible layer which is bonded on one side to an adhesive and on the other side to a removable laminate support layer wherein the bond between the frangible layer and the laminate layer is a non-destructible bond, and wherein the frangible layer has slits.

13. An article useful in applying tamper evident films comprising a polystyrene film non-destructibly adhered to a laminate support film on one side and adhered to a pressure sensitive adhesive on the other side.

14. The article of claim 13 wherein the polystyrene layer has a thickness from about 0.5 to about 2.5 mils.

15. The article of claim 13 wherein the laminate support film is a polyethylene terephthalate.

16. The article of claim 13 wherein the thickness of the laminate layer is from about 0.7 to about 2.8 mils.

17. The article of claim 13 wherein the polystyrene film has slits.

* * * * *